United States Patent [19]

Rhim et al.

[11] Patent Number: 4,521,854

[45] Date of Patent: Jun. 4, 1985

[54] CLOSED LOOP ELECTROSTATIC LEVITATION SYSTEM

[75] Inventors: Won-Kyu Rhim; Melvin M. Saffren, both of Pasadena; Daniel D. Elleman, San Marino, all of Calif.

[73] Assignee: The United States of America as represented by the Administrator of the National Aeronautics and Space Administration, Washington, D.C.

[21] Appl. No.: 437,912

[22] Filed: Oct. 29, 1982

[51] Int. Cl.³ .............................................. G06F 15/20
[52] U.S. Cl. .................................. 364/400; 74/5.6 D; 156/DIG. 62; 364/453
[58] Field of Search ............... 364/400, 453, 130, 183; 74/5.6 D, 5.22, 5.34, 5.4, 5.41, 5.42, 5.7, 5 R; 204/164, 406; 156/DIG. 62; 33/318, 321; 244/1 R, 159, 161, 163; 358/107, 139, 160

[56] References Cited

U.S. PATENT DOCUMENTS 3,269,179  8/1966  Anderson ......................... 364/453 X
3,534,926 10/1970  Wuenscher ............. 156/DIG. 62 X
3,741,500  6/1973  Liden ................................. 33/321 X
3,847,026 11/1974  Boltinghouse et al. ............ 74/5.6 D
3,902,374  9/1975  Hoffman et al. .................. 74/5.7 X
4,443,855  4/1984  Bishop et al. .................... 358/107 X Primary Examiner—Joseph Ruggiero
Attorney, Agent, or Firm—Paul F. McCaul; John R. Manning; Thomas H. Jones

[57] ABSTRACT

An electrostatic levitation system is described, which can closely control the position of objects of appreciable size. A plurality of electrodes surround the desired position of an electrostatically charged object, the position of the object is monitored, and the voltages applied to the electrodes are varied to hold the object at a desired position. In one system, the object is suspended above a plate-like electrode (16, FIG. 1) which has a concave upper face (26) to urge the object toward the vertical axis (20) of the curved plate. An upper electrode (18) that is also curved can be positioned above the object, to assure curvature of the field at any height above the lower plate. In another system, four spherical electrodes (81–84, FIG. 6) are positioned at the points of a tetrahedron, and the voltages applied to the electrodes are varied in accordance with the object position as detected by two sensors (94, 96 FIG. 4).

5 Claims, 9 Drawing Figures

CLOSED LOOP ELECTROSTATIC LEVITATION SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

It is sometimes very important to conduct manufacturing processes such as the melting of materials, without contact of the materials with a solid container that might contaminate the material or affect the shape of a molten object. Objects have been levitated by systems using acoustic and magnetic forces, but such systems have disadvantages in some applications. Electrostatic forces can be used, but only if a system is provided that enables close control of object position in three dimensions.

SUMMARY OF THE INVENTION

In accordance with one embodiment of the present invention, an electrostatic levitation system is provided for closely controlling the position of an object. The system includes a plurality of electrodes that surround a location where an electrically charged object is to be levitated, a sensor that senses the position of the object, and a circuit that applies voltages to the electrodes and that adjusts the voltages in accordance with the object position detected by the sensor to maintain the object at the desired position.

In one system, a pair of electrodes are utilized which include a lower electrode having a concave face that is directed upwardly, and an upper electrode having a convex face that is directed downwardly. The resulting curved field urges the object toward the vertical centerline of the electrode faces, so the object lies stably along this axis and only the height of the object along this axis is controlled. In another arrangement, a group of rounded electrodes such as spheres are arranged at the corners of a polyhedron, such as by using four balls arranged at the corners of a tetrahedron. The position of a charged object can be controlled in three dimensions by controlling the relative voltages of the four electrodes. A sensor for sensing the position of the object along a particular axis, can include a CCD (charge coupled device) on which an image of the object is focused. Cells of the CCD both above and below a predetermined line may sense portions of the object image. A computing circuit counts the number of cells both above and below the line and varies the relative electrode voltages to move the image so there are an equal number of cells above and below the line that sense the image.

DESCRIPTION OF THE PREFERRED EMBODIMENTS

Figure 1:
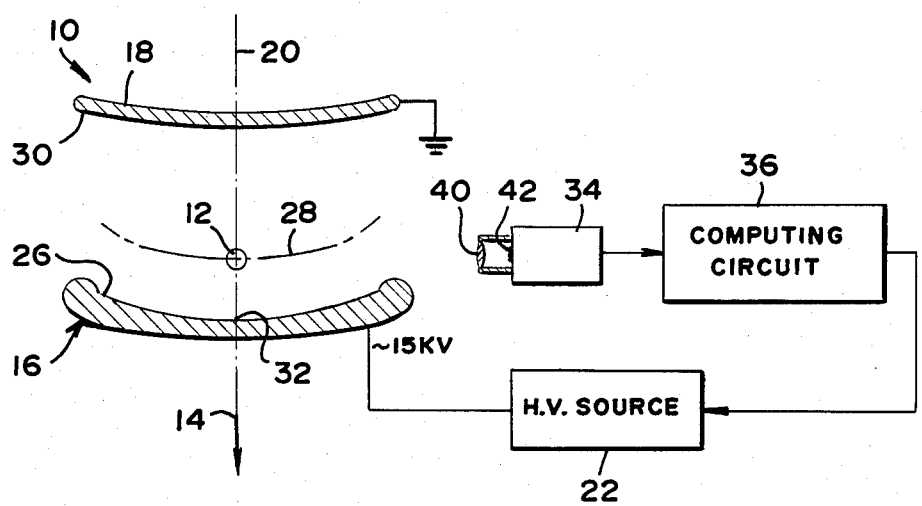
FIG. 1 is a partially sectional and block diagram view of an electrostatic levitation system constructed in accordance with one embodiment of the invention.

FIG. 1 illustrates an electrostatic levitation system 10 which can be used in an appreciable gravity environment such as at the earth's surface, to levitate an electrically charged object 12 that is being pulled by the force of gravity along the downward direction 14. The system includes a pair of electrodes 16, 18 located respectively below and above the desired position of the object. It can be seen in FIG. 1, that the object is of smaller width (in a horizontal direction) and length (in a vertical direction) than the width of either electrode in a direction perpendicular to axis 20. Also, it can be seen that the separation of the electrodes is everywhere greater than the width and length of the object. The two electrodes 16, 18 are circular as seen in a plan view, and the system is symmetrical about a vertical axis 20. A high voltage source 22 applies a high voltage such as 15 KV (kilovolts) to the lower electrode 16, while the upper electrode 18 is connected to ground. The object 12 and lower electrode 16 are of the same polarity, so the object is repelled to support it against the force of gravity, at a location above the lower electrode. The upwardly directed face 26 of the lower electrode is concave and of considerable width and length, or dish-shaped, to produce an equipotential line 28 with its lowest point at the axis 20, so the object tends to remain along the axis 20. The downwardly directed face 30 of the upper electrode is made convex, to maintain considerable curvature of the field at locations high above the lower electrode 16. It can be seen from FIG. 1 that the surfaces or faces 26, 30 face each other along the axis 20, the axis 20 being normal to the facing surfaces, and each surface is substantially continuous between its opposite sides as seen in a sectional view.

The object 12 can be maintained at a predetermined height above the center point 32 of the lower electrode, by a feedback circuit which includes a sensor 34 that senses the position of the object and delivers this information to a computing circuit 36. When the object rises above the desired position, the computing circuit controls the high voltage source 22 to reduce the voltage applied to the lower electrode 16 to allow the object to move down slightly. Similarly, if the object drops below the desired position, the voltage of the lower electrode is raised slightly to raise the object. The computing circuit 36 may be a minicomputer programmed not only to change the voltage on the lower electrode, to change the height of the object, but to adjust the rate of variation to account for oscillations of the object.

Figure 2:
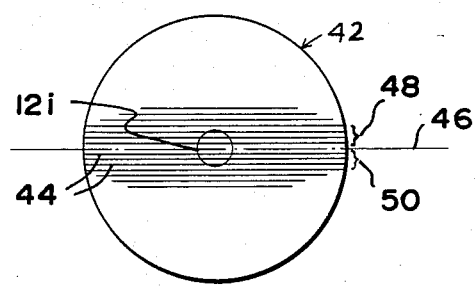
FIG. 2 is a front elevation view of a CCD of the system of FIG. 1.

The sensor 34 can include a lens 40 that forms an image of the object 12 on a CCD (charge coupled device) 42. FIG. 2 is a simplified view of a CCD which includes numerous strip shaped pixels 44 that can each store and deliver a signal that is dependent on the amount of light incident thereon. In actuality, such CCD's are usually formed with rows and columns of pixels, but only each row is considered herein. The image 12 of the object is shown at a position wherein it is centered on a line 46, which represents the desired position of the center of the object. In that case, the number of pixels in the group 48 above the line, which sense the object, equals the number of pixels in the group 50 below the line that sense the object. If the object were to move down, there would be a greater number of sensing pixels 50 in the lower group than in the upper group 48. The computing circuit 36 can be operated to subtract the number of pixels in the lower group 50 from the number in the upper group 48, and to decrease or increase the voltage applied to the lower electrode 16 as the difference is respectively positive or negative.

Figure 3:
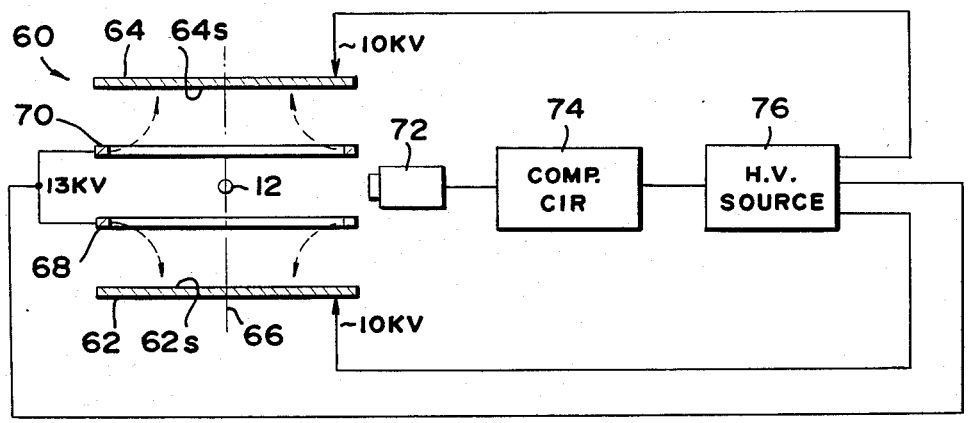
FIG. 3 is a partially sectional and block diagram view of a levitation system constructed in accordance with another embodiment of the invention.

FIG. 3 illustrates another levitation system 60 which utilizes a pair of main electrodes 62, 64 with plate-like surfaces 62s, 64s facing each other to control the position of the charged object along an axis 66. A pair of ring electrodes 68, 70 are also provided, to urge the object toward the center line 66. Each ring extends in a continuous circle about the axis 66. This system is especially useful where there are no non-electrostatic forces such as gravity to urge the object in a particular position, such as can be encountered in the zero gravity environment of a satellite. A sensor 72 senses the position of the object 12 along the axis 66 and delivers the information to a computer circuit 74 the controls a high voltage source 76. The high voltage source applies nominally the same voltage to both of the main electrodes 62, 64. However, when the object 12 moves along the axis 66 towards one of the electrodes such as 62, the voltages applied to both electrodes can be varied, as to increase the voltage on electrode 62 and decrease the voltage on the other electrode. Instead of this, the voltage of only one of the electrodes can be changed. The voltage source 76 also applies a constant voltage difference between the main electrodes (or one of them) and the two ring electrodes. In one example, the two main electrodes 62, 64 are each maintained at about 10 kilovolts, while the ring electrodes 68, 70 are maintained at about 13 kilovolts.

Figure 4:
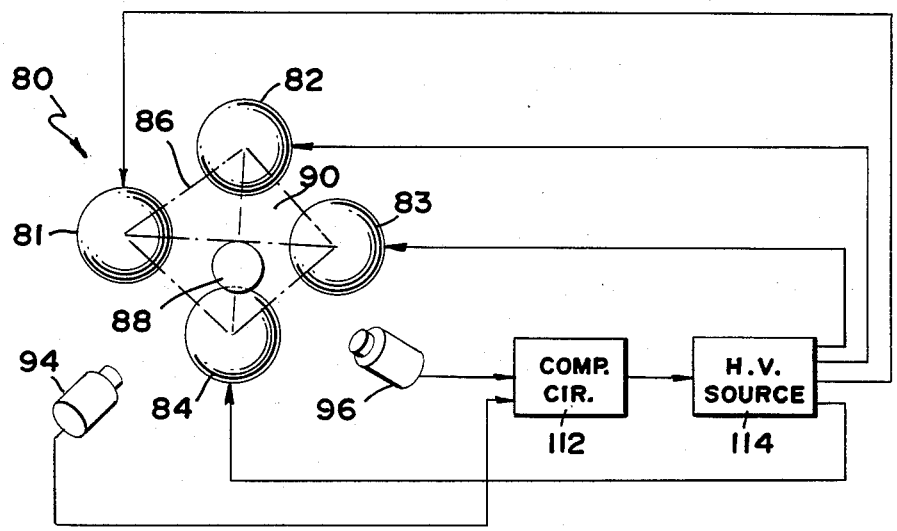
FIG. 4 is a perspective view of a levitation system constructed in accordance with another embodiment of the invention.

FIG. 4 illustrates another levitation system 80 which includes four spherical electrodes 81–84 that are positioned at the corners of an imaginary tetrahedron 86. The electrodes can levitate a charged object 88 that is located within the volume defined by the imaginary tetrahedron, and enables close control of the position of the object along three dimensions. Each of the electrodes 81–84 has a largely spherical shape to form a rounded surface that faces the inside of the imaginary tetrahedron. The rounded configuration of the electrodes avoids sharply curved surfaces that could generate arc discharges when high voltages are applied. The largely spherical surfaces at the locations that face the inside of the tetrahedron can simplify calculations of the behavior of the object as the voltages are varied.

Each of the four faces of the tetrahedron 86 is a triangle defined by three of the electrodes. For example, the uppermost face 90 of the tetrahedron as shown in the illustrations, is formed by the three uppermost electrodes 81–83. As a first approach, it is possible to control the position of the object 88 along a vertical line 92 (FIG. 6) by varying the voltage of the lowermost electrode 84 with respect to the three uppermost electrodes 81–83. A similar approach could be utilized for controlling the object position along each of the four axes that pass perpendicular to the four sides of the imaginary tetrahedron, and the position of the object along each of these axes could be sensed by a separate sensor. The equipment can be simplified by sensing the object position by two sensors 94, 96, with at least one of them 94, being capable of sensing the object position along two dimensions. The sensor 94 is similar to the sensor with the CCD 42 shown in FIG. 2, except that it includes pixels arranged in rows and columns. The particular CCD 98 shown in FIG. 7 receives an image 100 of the object, and can measure the object's position along two directions 102, 104. If the desired object's position along directions 102 is to be one where it is centered on the line 106, then the CCD 98 can measure the number of rows of pixels 108 that are above the line 106 as compared to those below the line 106, in the same manner as described above in connection with FIG. 2. In a similar manner, if the desired position of the objects along the directions 104 is such that it should be centered on the line 110, then the CCD can be used by measuring the number of pixles 108 which lie to the left of the line 110, as compared to the number that lie to the right of the line 110. The outputs of the two sensors 94, 96 in FIG. 4 are delivered to a computing circuit 112, which controls a high voltage source 114 that varies the voltages applied to the four electrodes to control the position of the object.

Figure 6:
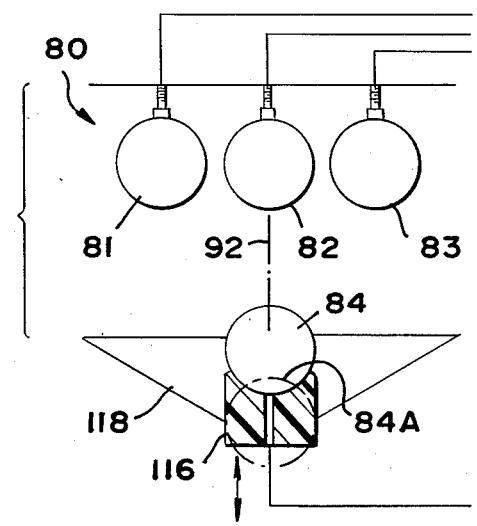
FIG. 6 is a view taken on the line 6—6 of FIG. 5.
Figure 7:
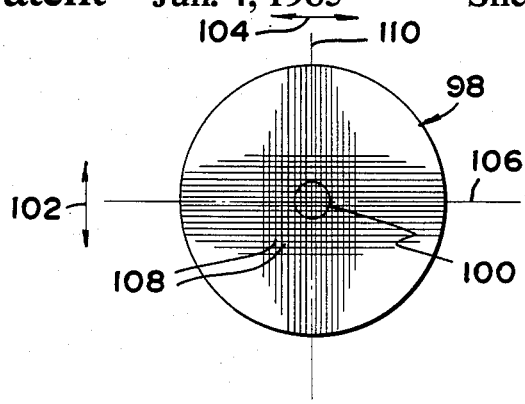
FIG. 7 is a front elevation view of a CCD of the system of FIG. 4.

A system has been constructed with four spherical electrodes arranged in a tetrahedron pattern, as shown in FIG. 6, and with the lowermost electrode 84 positioned on an insulative support 116 that could be raised and lowered with respect to a concave conductive surrounding support 118. To support an object, the support 116 was lowered, to lower the electrode 84 to the position 84A, and the object, such as a hollow sphere, was placed in the support 118 so that the object could bear against the electrode 84. With high voltages applied to the electrodes, the object quickly acquired a charge, and rapidly raised itself to a position within the tetrahedron defined by the four electrodes.

Figure 5:
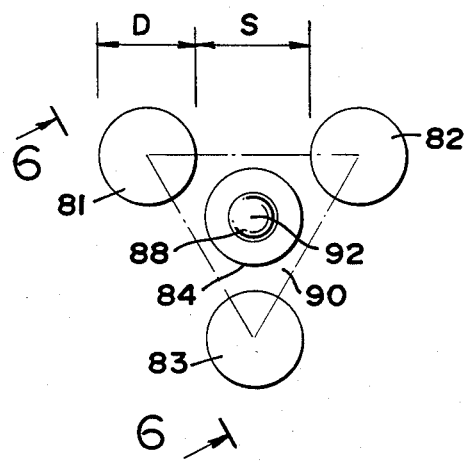
FIG. 5 is a plan view of the system of FIG. 4

As indicated in FIG. 5, each electrode such as 81 had a diameter D of about 1 inch, and the electrodes were spaced by a distance S of about one and one quarter inch. A spacing of electrodes of between about one-half of an electrode diameter and twice the electrode diameter (or at least of the electrode surface that faces the inside of the polyhydron) is desirable. A spacing of less than about one-half of the electrode diameter does not provide sufficient room to easily view the suspended object, while a spacing of more than about twice the electrode diameter results in a relatively low force being applied to the object for a given voltage. The charge or voltage of the object 88 can be of the same or opposite polarity to the voltage applied to any of the electrodes, and it is possible to apply different polarities of voltages to different electrodes. However, in experiments that applicants have performed, the same polarities of voltages were applied to all electrodes and the levitated object.

Figure 8:
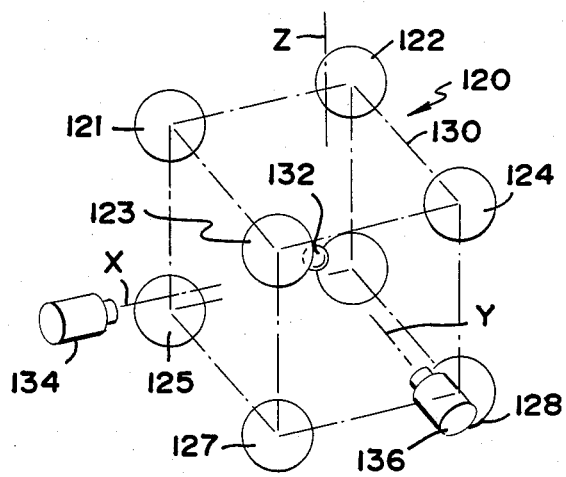
FIG. 8 is a perspective view of another embodiment of the invention.

Although the use of four electrodes arranged at the corners of an imaginary tetrahedron enables three-dimensional object control with a minimum number of electrodes, a greater number of electrodes can be utilized. FIG. 8 shows a system 120 which includes eight electrodes 121–128 positioned at the corners of an imaginary cube 130, and with an object 132 levitated at the center of the cube. The position of the object in three dimensions that correspond to the three axes X, Y and Z of the system are sensed by two sensors 134, 136 that can each include a CCD of the type shown in FIG. 7. As mentioned earlier, a polyhedron with six sides formed by eight electrodes is easier to understand and make calculations for, although it utilizes twice as many electrodes and voltage sources as the tetrahedron. There would normally be no reason to use more than eight spherical electrodes in a system that controls object position within a limited area.

Figure 9:
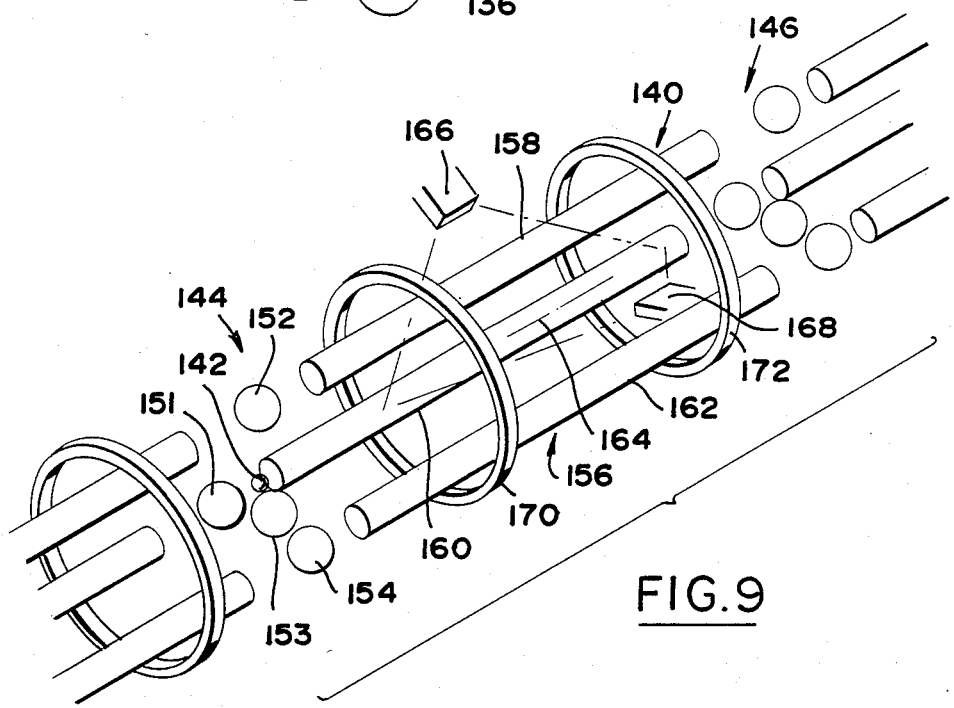
FIG. 9 is a perspective view of another embodiment of the invention.

FIG. 9 illustrates another system 140 which enables the movement of an object 142 between several work stations such as 144, 146, and the accurate positioning of the object in three dimensions at each work station, all by electrostatic levitation to avoid direct contact of a solid with the object. Each work station such as 144 includes a group of electrodes, such as four of them 151–154 disposed about the object location. A transporter 156 extends between each pair of work stations, and includes three elongated cylindrical electrodes 158, 160, 162 uniformly spaced about an axis 164. A pair of sensors 166, 168 sense the location of the object, and the sensing is used to control a high voltage source that controls the relative voltages of the electrodes 158–162. A pair of ring electrodes 170, 172 that encircle locations along the axis 164, enable control of movement of an object along the axis, and into or out of a work station. Thus, an object initially positioned at a work station 44, can be moved along the axis 164, by controlling the voltage on the electrodes 158–162 to maintain the object on the axis and by controlling the voltage of the ring electrodes 170, 172 to move the object to propel it until it reaches the work station 46.

Thus, the invention provides systems for electrostatically levitating a charged object. This can be accomplished by using plate-like electrodes that are cuved so one is concave and the other is convex, to hold the object along an axis connecting the plates. The position of the object along the axis is controlled by sensing the object position, as with a CCD instrument, and controlling the relative voltages on the plates. In another arrangement, one or more ring electrodes surround the space lying between the two plates, to hold the object along the centerline or axis connecting the plates. In another system which enables control of an object along three dimensions, at least four electrodes are utilized that are arranged at the corners of an imaginary polyhedron. Four such electrodes can be used which have substantially spherical surfaces facing the inside of a tetrahedron.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for electrostatically levitating a charged object, comprising:

a pair of spaced main electrodes with continuous electrically conductive plate-like surfaces that face each other, each surface having opposite sides and a substantially continuous surface extending between their opposite sides as seen in a sectional view, said surfaces facing each other along a predetermined, imaginary axis that extends substantially normal to said plate-like surfaces and passes substantially through their centers;

at least one ring-shaped electrode which surrounds a space lying between said main electrodes, said ring-shaped electrode extending in a continuous circle around said axis; and a voltage source coupled to said main and ring-shaped electrodes to apply voltages to them without substantially passing currents around their perimeters.

2. Apparatus for electrostatically levitating a charged object, comprising:

a group of at least four electrodes, each electrode being itself of largely spherical shape, the centers of said electrodes lying at the corners of an imaginary polyhedron;

means for sensing the position of an object lying within said imaginary polyhedron along at least three axes that pass through said polyhedron; and means for applying voltages to said electrodes of relative amplitudes selected to urge the object toward a predetermined position along said axes.

3. The apparatus described in claim 2 wherein: said electrodes are spaced by between about one-half and twice their diameters.

4. The apparatus described in claim 2 wherein: said group consists of four electrodes lying at the corners of an imaginary tetrahedron having triangular sides.

5. Apparatus for electrostatically levitating a charged object, comprising:

a lower electrode, and an upper electrode lying a predetermined distance above said lower electrode;

means for applying a voltage to said lower electrode to apply an electrostatic force to an object lying a small distance above the lower electrode, and for applying a lower voltage to said upper electrode than to said lower one;

said lower electrode having a concave dish-shaped surface facing upwardly and said upper electrode having a convex surface facing downwardly toward said lower electrode, whereby to urge the object toward a position directly above the lowermost portion of the concave surface.

* * * * *